: US 7,445,212 B2
(45) Date of Patent: Nov. 4, 2008

(54) BRUSH SEAL

(75) Inventors: Alfons Gail, Friedberg (DE); Lodewijk Prins, Eurasburg (DE); Klemens Werner, München (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 09/832,637

(22) Filed: Apr. 11, 2001

(65) Prior Publication Data

US 2002/0020968 A1 Feb. 21, 2002

(30) Foreign Application Priority Data

Apr. 13, 2000 (DE) .................... 100 18 273

(51) Int. Cl.
*F16J 15/44* (2006.01)
*F16J 15/32* (2006.01)
(52) U.S. Cl. ............... 277/355; 277/421; 277/572; 277/573; 277/574; 277/575; 403/22
(58) Field of Classification Search ........... 277/355, 277/421, 572–575, 372; 403/22, 271
See application file for complete search history.

(56) References Cited

U.S. PATENT DOCUMENTS

| 885,032 | A | * | 4/1908 | DeFerranti | 277/355 |
|---|---|---|---|---|---|
| 2,527,479 | A | * | 10/1950 | Hall | 287/11 |
| 2,635,167 | A | * | 4/1953 | Nelson | 219/10 |
| 3,042,159 | A | * | 7/1962 | Anderson | 189/36 |
| 4,405,134 | A | * | 9/1983 | Sargent et al. | 277/422 |
| 4,406,466 | A | * | 9/1983 | Geary, Jr. | 277/400 |
| 4,451,048 | A | * | 5/1984 | Pick | 277/387 |
| 4,477,227 | A | * | 10/1984 | Klufas | 416/198 A |
| 4,889,349 | A | * | 12/1989 | Muller | 277/556 |
| 5,056,799 | A | * | 10/1991 | Takenaka et al. | 277/47 |
| 5,066,024 | A | * | 11/1991 | Reisinger et al. | 277/355 |
| 5,066,025 | A | * | 11/1991 | Hanrahan | 277/355 |
| 5,114,159 | A | * | 5/1992 | Baird et al. | 277/355 |

(Continued)

FOREIGN PATENT DOCUMENTS

DE 196 28 559 1/1998

(Continued)

OTHER PUBLICATIONS

WO98/53229 Nov. 1997 Werner et al.*

(Continued)

*Primary Examiner*—Victor Batson
*Assistant Examiner*—David C Reese
(74) *Attorney, Agent, or Firm*—Kenyon & Kenyon LLP

(57) ABSTRACT

A brush seal for sealing a rotor with respect to a stator includes a bristle housing which is held on the stator or rotor, a cover plate, a supporting plate, a circumferential surface and two side surfaces and in which bristles oriented with their free ends to the rotor or stator are fastened. The bristle housing, for ensuring correct, anti-rotation installation in its seat, includes a first positioning arrangement on at least one side surface or the circumferential surface, the first positioning arrangement interacting in a positive-locking manner with a correspondingly configured second positioning arrangement on the stator or rotor or a separate fastening element for the definite positioning of the bristle housing.

10 Claims, 4 Drawing Sheets

U.S. PATENT DOCUMENTS

| | | | |
|---|---|---|---|
| 5,201,530 A * | 4/1993 | Kelch et al. | 277/355 |
| 5,351,971 A * | 10/1994 | Short | 277/355 |
| 5,474,305 A * | 12/1995 | Flower | 277/355 |
| 5,597,167 A | 1/1997 | Snyder et al. | |
| 5,794,938 A * | 8/1998 | Hofner et al. | 277/53 |
| 6,027,121 A * | 2/2000 | Cromer et al. | 277/347 |
| 6,045,134 A * | 4/2000 | Turnquist et al. | 277/347 |
| 6,053,502 A * | 4/2000 | Hallenstvedt | 277/572 |
| 6,053,697 A * | 4/2000 | Piekarski et al. | 415/115 |
| 6,079,945 A * | 6/2000 | Wolfe et al. | 415/231 |
| 6,105,967 A * | 8/2000 | Turnquist et al. | 277/355 |
| 6,106,190 A * | 8/2000 | Nakamura et al. | 403/408.1 |
| 6,168,162 B1 * | 1/2001 | Reluzco et al. | 277/355 |
| 6,293,553 B1 * | 9/2001 | Werner et al. | 277/355 |
| 6,302,400 B1 * | 10/2001 | Werner et al. | 277/355 |
| 6,331,006 B1 * | 12/2001 | Baily et al. | 277/355 |
| 6,367,810 B1 * | 4/2002 | Hatch | 27/551 |
| 6,471,212 B1 * | 10/2002 | Dierker et al. | 277/355 |

FOREIGN PATENT DOCUMENTS

| | | |
|---|---|---|
| DE | 197 20 648 | 11/1998 |
| DE | 197 20 649 | 9/2000 |
| EP | 0 534 686 | 3/1993 |
| EP | 0 632 218 | 1/1995 |
| EP | 1 008 787 | 6/2000 |
| GB | 2 315 302 | 1/1998 |

OTHER PUBLICATIONS

WO98/53229 Nov. 1997 Werner et al.*

* cited by examiner

BRUSH SEAL

FIELD OF THE INVENTION

The present invention relates to a brush seal for sealing a rotor with respect to a stator. The brush seal includes a bristle housing which is held on the stator or rotor, a cover plate, a supporting plate, a circumferential surface and two side surfaces and in which bristles oriented with their free ends to the rotor or stator are fastened.

BACKGROUND INFORMATION

In conventional brush seals, the free ends of the bristles fastened in a bristle housing having a cover plate and a supporting plate extend against a sealing surface of the rotor or stator and thus seal off the annular gap between rotor and stator. With a good sealing effect and in a conventional arrangement, axial construction space can be saved with such brush seals compared with seals which can be used as an alternative, such as labyrinth seals, for example when used in stationary gas turbines or aircraft engines. The bristles of the brush seals can be set in the direction of rotation of the rotor at an angle of, for example, 40° to 50°, in order to permit a smooth, radial deflection of the bristles upon contact with the rotor. On account of the set bristles, reliable functioning in the event of incorrect installation of the brush seal, i.e., the brush seal is inserted in the incorrect orientation into its seat on the stator or rotor and the bristles are set against the direction of rotation of the rotor, is not ensured, since the bristles can partly bend to a considerable extent. The brush seal is held in its seat on the stator or rotor with a press fit in order to prevent rotation during operation. The press fit may prove to be critical with regard to the material loads, in particular in the case of large external dimensions of the bristle housing.

It is an object of the present invention to provide a brush seal with which correct, anti-rotation installation is ensured when the brush seal is assembled, for example, in a housing. The brush seal thus improved is to be produced, where possible, without additional manufacturing steps.

SUMMARY

The above and other beneficial objects of the present invention are attained by providing a brush seal in which the bristle housing includes a first positioning arrangement on at least one side surface or the circumferential surface, the first positioning arrangement interacting in a positive-locking manner with a correspondingly designed second positioning arrangement on the stator or rotor or a separate fastening element for the definite positioning of the bristle housing.

Due to first and second positioning arrangements, interacting in a positive-locking manner, for positioning the bristle housing in a seat on the stator, such as, for example, a housing, or on the rotor, defined and definite positioning of the brush seal must be ensured for the assembly, since assembly is not possible with any other, incorrect positioning. In addition, the first positioning arrangement engaging in a positive-locking manner in the seat of the brush seal when the latter is inserted may readily be provided on the cover plate or supporting plate during the production of the brush seal. The second positioning arrangement interacting with the first positioning arrangement may be produced in a simple manner when forming the seat for the brush seal on the stator or rotor.

The brush seal is generally arranged, for example, in a stationary gas turbine or an aircraft engine, so that its bristles extend in a radial plane and the center axis of the rotor extends in the axial direction of the gas turbine. During operation, the brush seal seals off a differential pressure between a space of higher pressure P1 and a space of lower pressure P2. The cover plate and supporting plate of the bristle housing are generally configured as discs having an internal bore for accommodating the rotor or also the stator in other applications.

The first positioning arrangement may be configured as a projection and the second positioning arrangement may be configured as a recess, or vice versa, so that defined and definite, positive-locking engagement of the two positioning arrangements is ensured for the assembly of the brush seal in a seat on the stator or rotor. Otherwise, final assembly, during which a separate fastening element is inserted into a slot on the stator or rotor for restraining the brush seal pushed into its seat, is not possible.

In order to form the first positioning arrangement, the cover plate and/or the supporting plate may be produced by non-cutting shaping, such as, for example, deep drawing, in which the bristle housing may be produced by flanging of the cover plate and the supporting plate to form a one-piece component.

The first positioning arrangement may be configured as at least one weld spot which projects beyond the circumferential surface of the bristle housing and engages in a recess, correspondingly designed as second positioning arrangement, on the stator or rotor for the defined, anti-rotation positioning of the brush seal. A welding process having low generation of heat is used to avoid deformation of the plates.

Such a projection in the form of a weld spot extends circumferentially only over a short section and serves as an anti-rotation locking arrangement for the brush seal in its seat on the stator or rotor. Such an anti-rotation locking arrangement includes the advantage that the pressure of the brush seal in its seat may be selected to be lower, which is advantageous with regard to the material load, in particular in brush seals having large diameters at the circumferential surface of the bristle housing. The weld spot may also be configured as at least one weld extending over approximately 10 mm along the circumference.

Furthermore, the first positioning arrangement may be configured as at least one integral projection which projects beyond the side surface of the bristle housing, does not extend around the entire circumference, and engages in a recess, correspondingly configured as the second positioning arrangement, on the stator or rotor or the separate fastening element for the brush seal. The first positioning arrangement may alternatively be configured as a recess in the side surface and the second positioning arrangement may be configured as a projection on the stator or on the rotor or on a separate fastening element.

During the manufacture of the cover plate or supporting plate by non-cutting shaping or deep drawing, the projection may be formed as at least one lenticular or conical prominence during the deep drawing of the cover plate or supporting plate, i.e., without a further working step. Due to the prominence, the axial length of the bristle housing is increased and, in the event of incorrect installation, during which the bristles would be oriented against the direction of rotation of the rotor, assembly of the brush seal is prevented, since the fastening element to be finally used cannot be fitted. The prominence extends circumferentially only in sections and constitutes an anti-rotation locking arrangement for the brush seal in its seat on the stator or rotor.

Furthermore, with regard to the removal of the brush seal, which is necessary for maintenance, for example, a simplification of the assembly is provided in that the cover plate or the supporting plate includes a flanged section, the respectively other plate, at its end close to the circumferential surface of the bristle housing, includes an axial section projecting beyond the side surface or extending away from the bristles, and the flanged section encloses the free end of the axial section and projects radially beyond it with its free end while forming an undercut. If the bristle housing is held, for example, at its outer circumferential surface on a stator, the undercut is substantially open radially inwardly.

From the production point of view, such a measure may be realized in a simple manner without an additional working step in particular when the cover plate or supporting plate is produced by deep drawing and makes it possible for the brush seal, when using a correspondingly designed tool which engages behind the undercut, to be removed quickly from its seat in the stator or rotor without the bristle housing or the bristles being damaged.

To prevent the incorrect installation of the brush seal in its seat on the stator, such as a housing, or rotor, in the case of which incorrect installation the bristles would be set at an angle against the direction of rotation of the rotor, the first and the second positioning arrangements may be configured as at least one pair of holes which are in alignment in the stator or rotor and the axial and flanged sections for the definite positioning of the bristle housing by bolts, rivets, screws, etc. If brush seals are inserted incorrectly into their seat in the stator or rotor, the at least one hole in the housing, for example, is not arranged in the region of the axial and flanged sections of the brush seal so that fastening or insertion of the rivets, the bolts, etc. is not possible.

DETAILED DESCRIPTION

Figure 1:
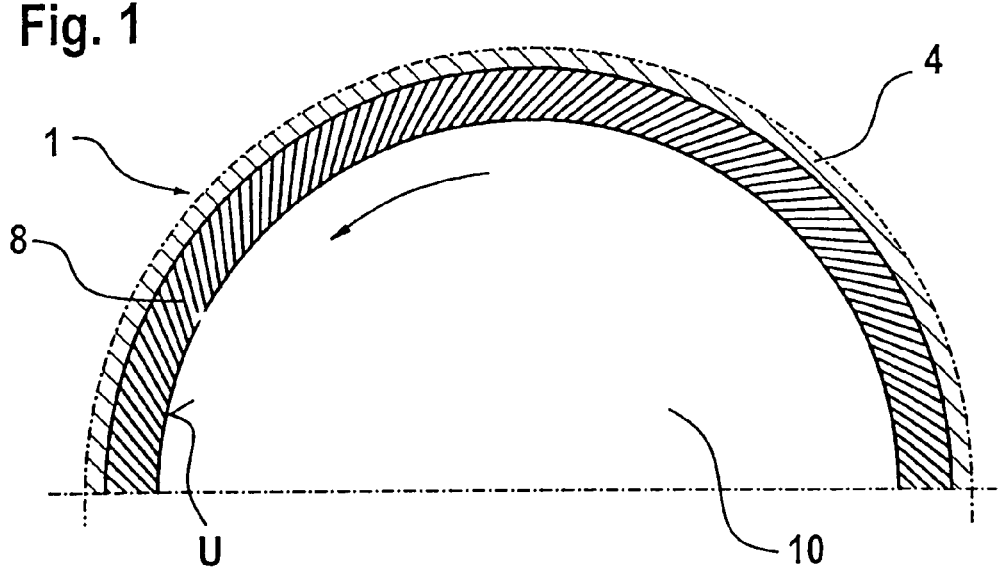
FIG. 1 is a plan view of a cutaway portion of a brush seal, the cutaway portion being restricted essentially to the bristles set in the direction of rotation of the rotor.

FIG. 1 is a plan view of a cutaway portion of a brush seal 1, this cutaway portion being restricted to the essential parts for illustrating the bristles 8 set in the direction of rotation of the rotor. FIG. 1 illustrates a section of a supporting plate 4 which forms a bristle housing 2 together with a cover plate 3. With their free ends, the bristles 8 touch a circumferential surface U of a rotor 10 and, starting from their clamping point, are set relative to the radial at an angle of between 40° and 50° in the direction of rotation of the rotor, which is identified by an arrow. In FIG. 1, the chain-dotted parting line extends in the radial direction. Due to the setting of the bristles 8, a smooth, radial deflection of the bristle stack upon contact with the rotor 10 is ensured. This arrangement results in low wear of the bristles 8 and also to a good sealing effect of the brush seal 1.

Due to the setting of the bristles 8, the brush seal 1 must not be fitted in any orientation in its seat on the stator, such as a housing, for example, or alternatively on the rotor. In the event of an incorrect installation of the brush seal 1, the bristles 8 are set at an angle against the direction of rotation of the rotor, which may result in bending of the bristles 8 and thus to failure of the sealing effect.

Figure 2:
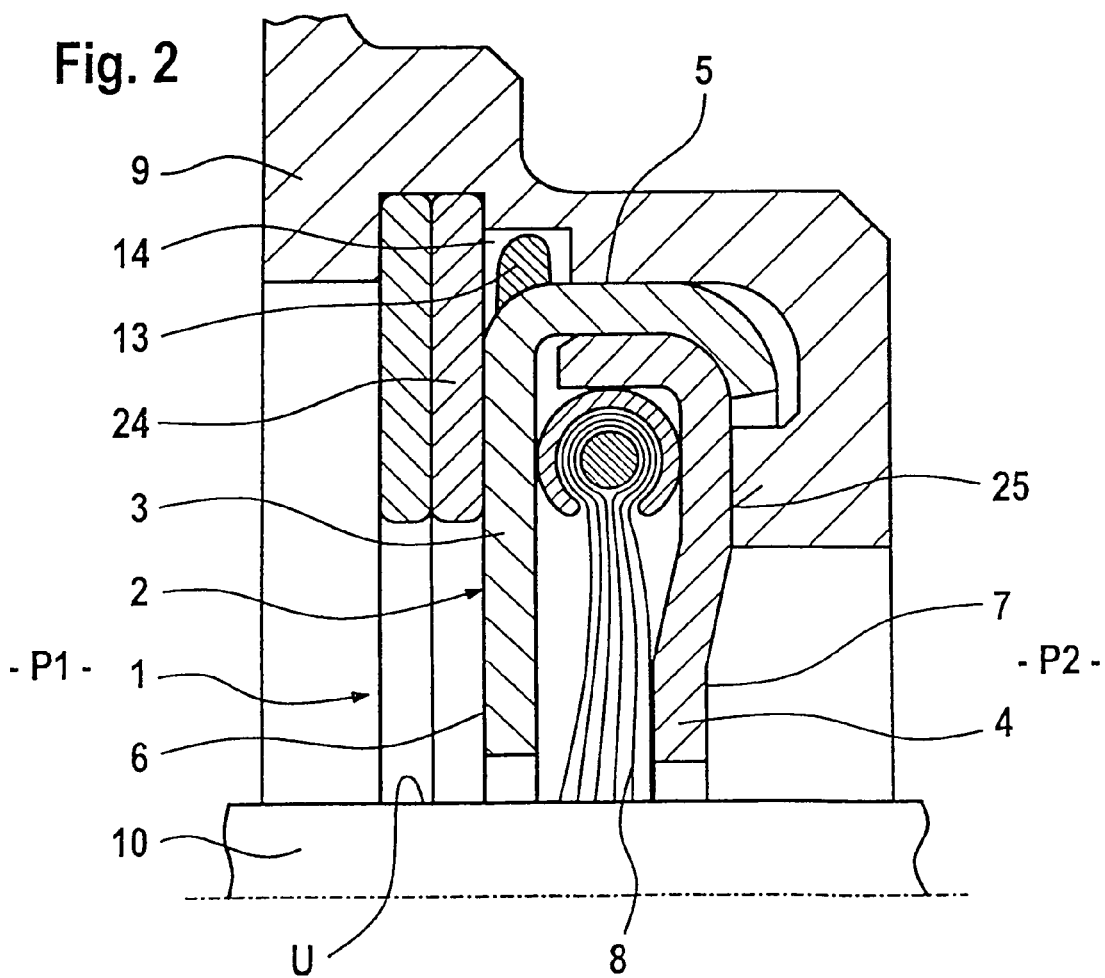
FIG. 2 is a cross-sectional view of an example embodiment of the brush seal according to the present invention.

FIG. 2 is a cross-sectional view of an example embodiment of the brush seal 1, which is inserted into a seat in a housing 9 and seals off the annular gap relative to a rotor 10 having a circumferential surface U between a space of higher pressure P1 and a space of lower pressure P2. The brush seal 1 includes a bristle housing 2, which is produced, for example, by flanging of a cover plate 3 and a supporting plate 4, between which bristles 8 are held. During assembly, the brush seal 1 is pushed into the seat until it abuts with a side surface 7 of its supporting plate 4 against a housing shoulder 25. The axial length of the seat for the brush seal 1 is established by the distance between the housing shoulder 25 and the fastening element 24.

To prevent incorrect installation, the bristle housing 2 includes a projection which projects beyond its circumferential surface 5, is designed as a weld spot 13 or as a weld (or a plurality of welds) extending approximately 10 mm along the circumference, and engages in a correspondingly designed recess 14 in the housing 9 for the definite positioning of the bristle housing 2. The weld spot 13 extends merely in sections in the circumferential direction and thus also serves as an arrangement configured to prevent the brush seal 1 from rotating in its seat. As a result, a lighter-duty press fit at the circumferential surface 5 of the bristle housing 2 with load relief of the components may be used.

Insertion of the brush seal 1 in the incorrect orientation into the seat in the housing 9 is not possible, since, on account of the weld spot 13 projecting beyond the circumferential surface 5, the bristle housing 2 abuts against the housing 9 and cannot be pushed into the seat provided. The recess 14 does not extend in a ring shape around the entire circumference of the seat for the brush seal 1 in the housing 9 but is merely a cutout in the housing 9, this cutout being adapted to the shape of the weld spot 13, which may be, for example, a tapering peg.

Figure 3:
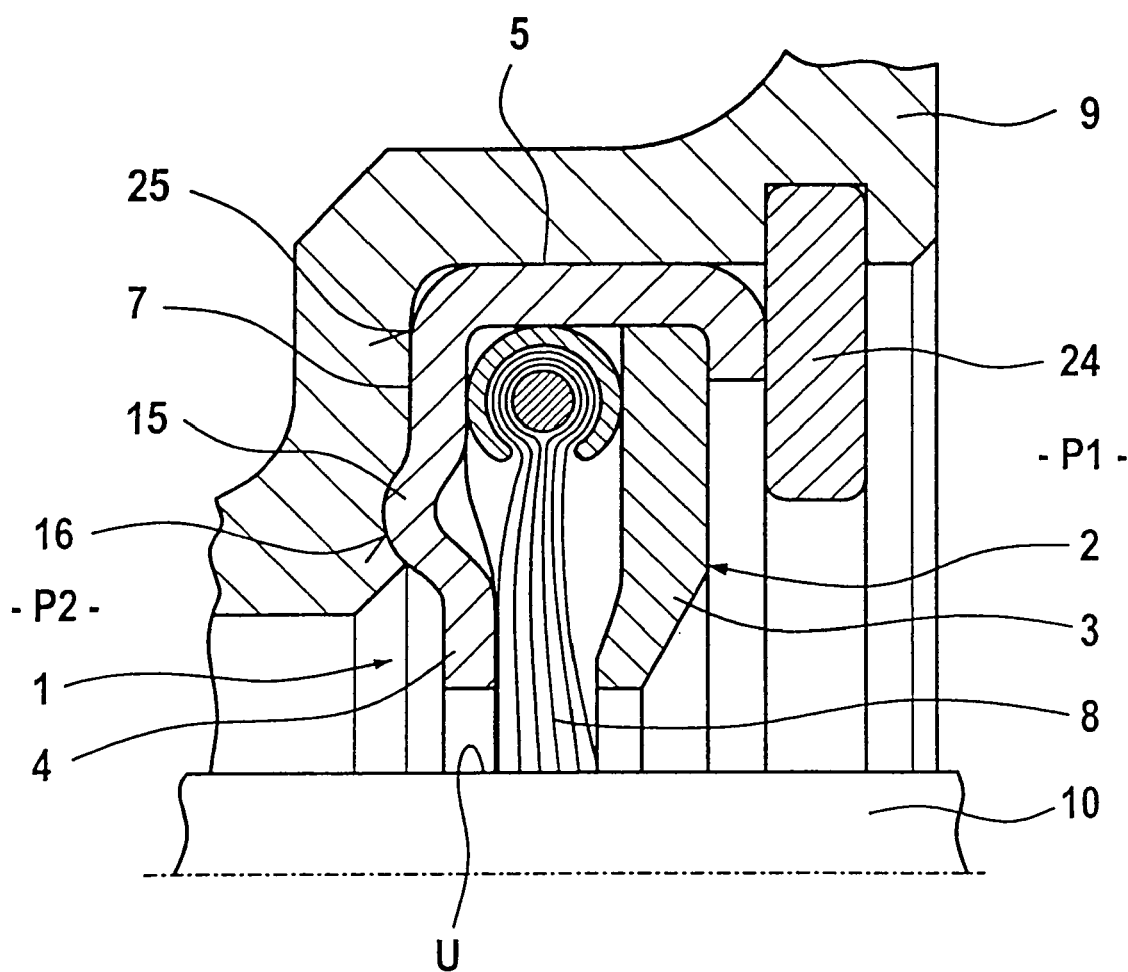
FIG. 3 is a cross-sectional view of a further example embodiment of the brush seal according to the present invention.

FIG. 3 is a cross-sectional view of a further example embodiment of the brush seal 1, which includes bristles 8 held in a bristle housing 2. The bristle housing 2 includes a cover plate 3 and a supporting plate 4, against which the bristles 8 are supported when a pressure difference is applied between a space of higher pressure P1 and a space of lower pressure P2. The brush seal 1 is held on the stator 9 between a fastening element 24 and a housing shoulder 25 and seals off the annular gap relative to a rotor 10 having a circumferential surface U.

To prevent the incorrect installation, in which the bristles 8 would be oriented at an angle against the direction of rotation of the rotor, the bristle housing 2 includes a first arrangement on its supporting plate 4, this first arrangement being configured as a lenticular prominence 15 and interacting with a second arrangement via a positive-locking connection, this second arrangement being configured as a recess 16 in the stator 9. The prominence 15 projects beyond a side surface 7 of the bristle housing 2 and extends substantially in the axial direction. The prominence 15 extends only over a short section in the circumferential direction and defines an anti-rotation locking arrangement for the brush seal 1 in its seat in the housing 9, since the recess 16 is substantially adapted to the shape of the prominence 15.

Since the axial length of the construction space for the brush seal 1 is predetermined by the distance between the fastening element 24 and the housing shoulder 25, assembly of the brush seal 1, which involves the final insertion of the annular fastening element 24 into a housing recess, is not possible if the prominence 15 does not engage in the recess 16. The prominence 15 may be formed during the deep drawing of the cover and supporting plates 3 and 4, respectively, by an appropriate configuration of the deep-drawing tool without an additional manufacturing step. A plurality of prominences 15 which may have different shapes may be provided in the radial extent and circumferential extent of the cover and supporting plates 3 and 4, respectively.

Figure 4:
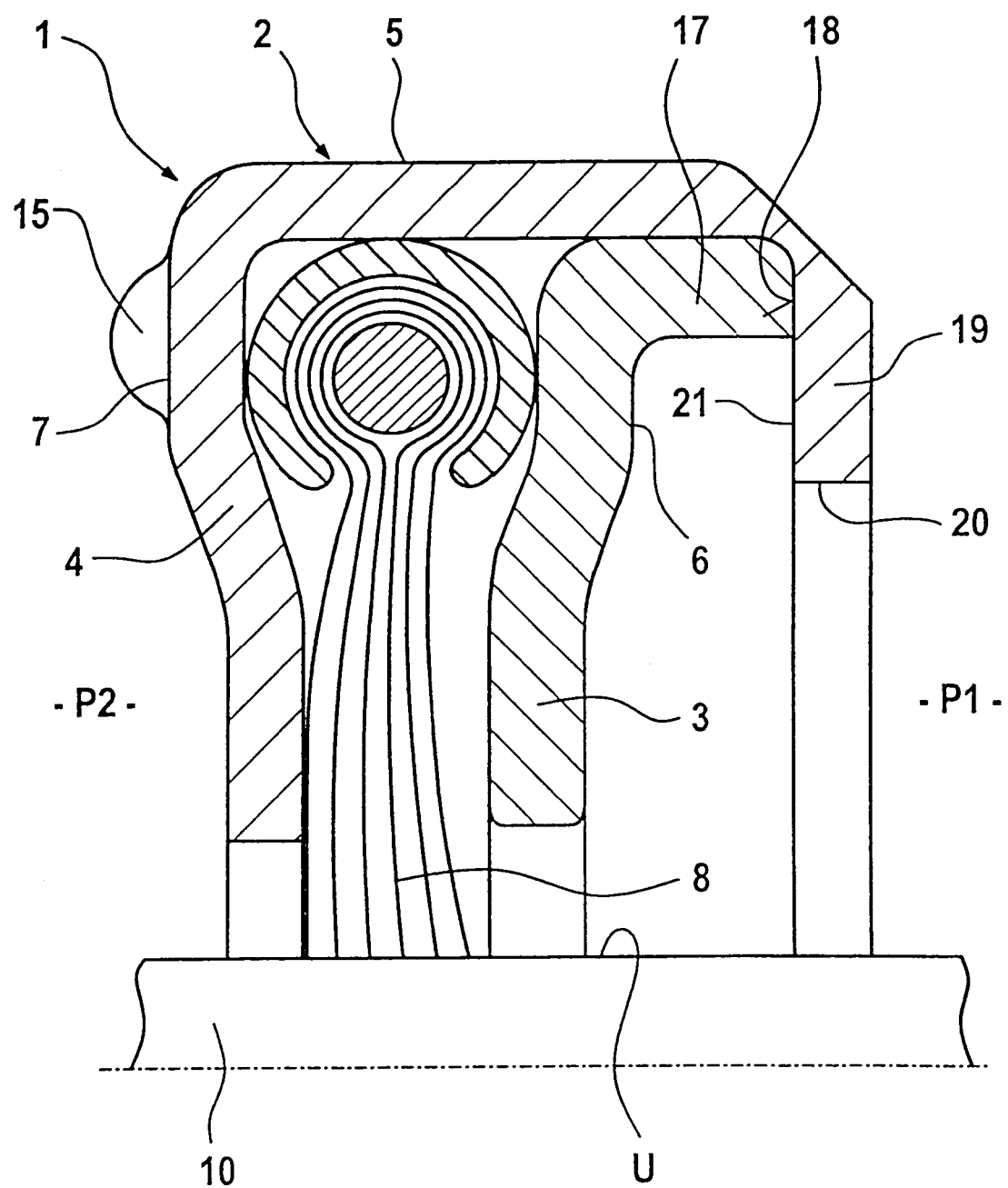
FIG. 4 is a cross-sectional view of another example embodiment of the brush seal according to the present invention with an undercut.

In a schematic cross-sectional view, FIG. 4 illustrates a further example embodiment of the brush seal 1, which seals off an annular gap between a stator (not shown) and a rotor 10 having a circumferential surface U. The brush seal 1 includes a bristle housing 2 which includes a cover plate 3 and a supporting plate 4 and in which a stack or bundle of bristles 8 is held. When a pressure difference is applied between a space of higher pressure P1 and a space of lower pressure P2, the bristles are supported on the supporting plate 4. The bristle housing 2 includes a circumferential surface 5 and a side surface 6 facing toward the space of higher pressure P1, and a side surface 7 facing toward the space of low pressure P2. With their free ends, the bristles 8 touch the circumferential surface U of the rotor 10.

For the assembly, the brush seal 1, as described above, is pushed into a seat on a stator 9, such as a housing, until the side surface 7 of the supporting plate 4 or of the bristle housing 2 abuts against a housing shoulder 25 (not shown in FIG. 4). At its end section close to the circumferential surface 5 of the bristle housing 2, the cover plate 6 includes an axial section 17 having a free end 18 which projects beyond the side surface 6 of the cover plate 3. The supporting plate 4, which in this example embodiment forms the circumferential surface 5 of the bristle housing 2, includes a flanged lip 19 at an end section which is not the inner end section facing the rotor 10, this flanged lip 19 enclosing the free end 18 of the axial section 17 of the cover plate 3 for forming the bristle housing 2. With its free end 20, the flanged section 19 projects radially beyond the axial section 17 of the cover plate 3 and includes an inner side surface 21 which faces toward the side surface 6 of the cover plate 3 and forms an undercut. An appropriately designed tool may engage in this undercut, this tool being placed against the inner side surface 21 of the flanged lip 19 when the brush seal 1 is being removed from its seat in a stator 9 (not shown). The brush seal 1 may thus be dismantled for maintenance or repair without any damage.

At its side surface 7, the supporting plate 4 includes a prominence 15, which is arranged behind the plane of the figure in the illustration according to FIG. 4 and by which the axial length of the bristle housing 2 is increased. If the brush seal 1 is inserted into the housing seat in the incorrect orientation, the prominence 15 cannot engage in a correspondingly configured recess (not shown in FIG. 4) in the housing. Consequently, the fastening elements 24 illustrated in FIGS. 2 and 3 cannot be inserted into the slot provided in the housing for fastening the brush seal 1 in its seat. The assembly cannot therefore be completed in the event of incorrect installation.

Figure 5:
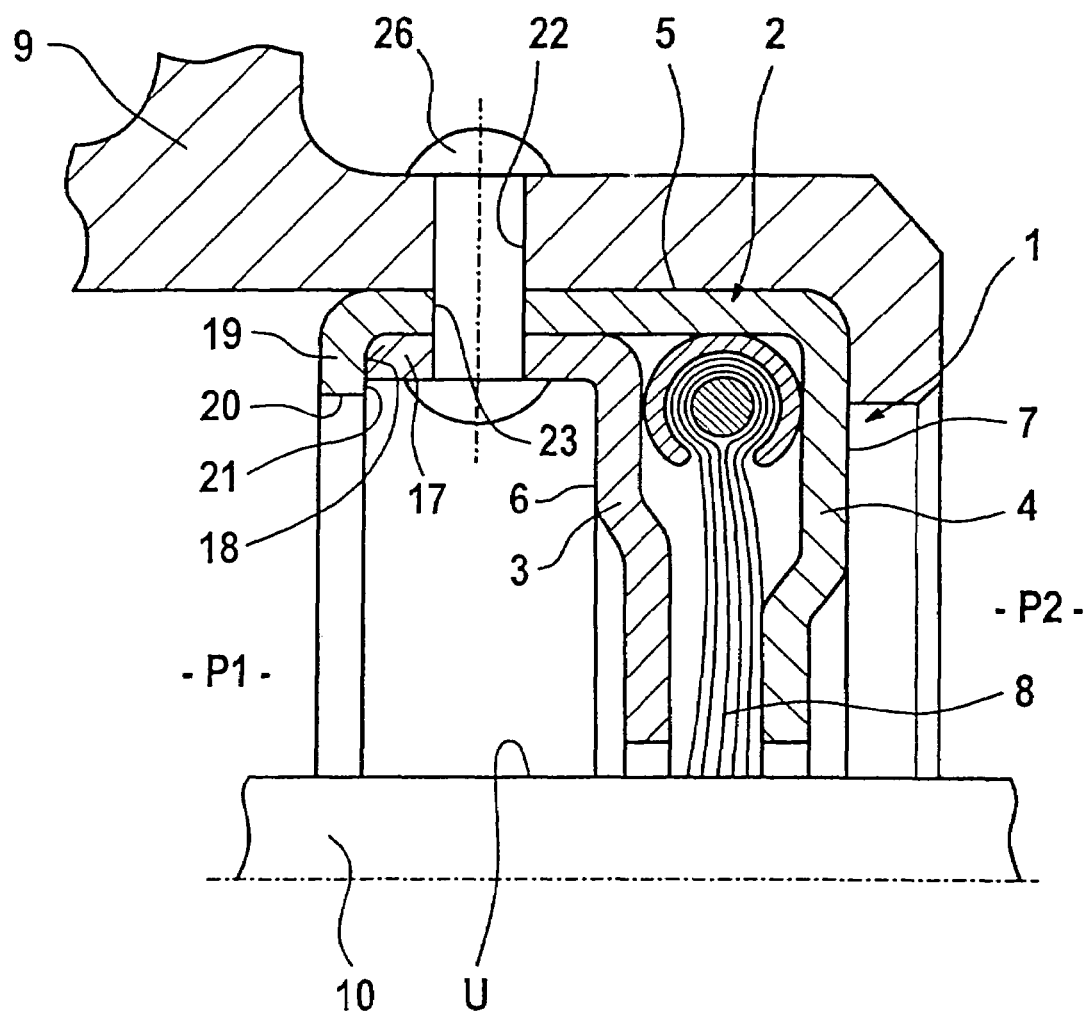
FIG. 5 is a cross-sectional view of yet another example embodiment of the brush seal according to the present invention which includes an undercut.

FIG. 5 is a cross-sectional view of a brush seal 1 which is similar to the brush seal 1 illustrated in FIG. 4, is held in a seat in a stator configured as a housing 9 and seals off an annular gap relative to a rotor 10 having a circumferential surface U between a space of higher pressure P1 and a space of low pressure P2. The brush seal 1 includes bristles 8 held in a bristle housing 2. The bristle housing 2 includes a cover plate 3 and a supporting plate 4, on which the bristles 8 are supported when a pressure difference is applied. The bristle housing 2 includes a side surface 6 facing toward the space of higher pressure P1, a side surface 7 facing toward the space of low pressure P2, and a circumferential surface 5.

In order to facilitate the removal of the brush seal 1 from its seat on the stator 9, the cover plate 3 includes an axial section 17 with a free end 18. The supporting plate 4 forming the circumferential surface 5 of the bristle housing 2 includes a flanged section 19 which encloses the free end 18 of the axial section 17 of the cover plate 3 while forming the bristle housing 2. With its free end 20, the flanged section 19, while forming an undercut 21, projects radially beyond the free end 18 of the axial section 17 of the cover plate 3, so that the brush seal 1 may be removed from its seat on the stator 9 in a simple manner without damage when using an appropriate tool.

To further improve the assembly, the housing 9 and the axial section 17 of the cover plate 3 and the flanged section 19 of the supporting plate 4 include a hole 22 and 23, respectively, these holes being in alignment when the brush seal 1 is correctly positioned in the seat on the housing 9. In order to ensure definite positioning of the brush seal 1 in the seat on the housing 9 and also an anti-rotation locking arrangement for the brush seal 1, a rivet 26, for example, is inserted into the holes 22, 23. If the brush seal 1 is inserted into the seat on the housing 9 in the incorrect orientation, the holes 22 and 23 in the housing 9 and respectively the axial section 17 of the cover plate 3 and the flanged section 19 of the supporting plate 4 are not in alignment, so that riveting is not possible and incorrect installation is noticed.

In the example embodiments of the brush seal 1 according to the present invention illustrated in FIGS. 2 to 5, the bristles 8 are set at an angle to the radial of approximately 40° to 50° in the direction of rotation of the rotor.

What is claimed is:

1. A brush seal for sealing a rotor with respect to a stator, comprising:

bristles including free ends oriented toward a first one of the rotor and the stator; and a bristle housing, the bristles fastened in the bristle housing, the bristle housing press-fit in an axial space between a fastening element and a second one of the rotor and the stator, the bristle housing press-fit on the second one of the rotor and the stator against movement in a radial direction relative to the second one of the rotor and the stator, the bristle housing including a cover plate having an outer side surface arranged on a first axial side of the bristles and an axial section that extends axially from the outer side surface in an axial direction away from the bristles toward the first axial side to a free end disposed on the first axial side of the bristles, a supporting plate having an inner side surface arranged on a second axial side of the bristles opposite the first axial side, and a circumferential section that extends from the inner side surface in the axial direction from the second axial side of the bristles to the first axial side of the bristles and axially beyond the free end of the cover plate to a flanged section, the flanged section spaced apart from the free end of the cover plate and projecting radially inwardly beyond the free end of the cover plate so as to form an undercut between the flanged section, the free end of the cover plate, and the outer side surface, the flanged section having a free end that does not directly contact the cover plate, the bristles being fastened in the bristle housing between the inner side surface and the outer side surface;

an integral projection provided on the supporting plate; and a recess provided on one of the rotor, the stator and the fastening element;

wherein the integral projection and the recess are configured to interact with each other in a positive-locking manner to maintain the press-fit against movement in a radial direction and to provide definite positioning of the bristle housing so as to prevent relative rotation and reversed mounting of the entire bristle housing.

2. The brush seal according to claim 1, wherein at least one of the cover plate and the supporting plate is formed by non-cutting shaping.

3. The brush seal according to claim 2, wherein the non-cutting shaping includes deep drawing.

4. The brush seal according to claim 1, wherein the bristle housing is formed by flanging the cover plate and the supporting plate.

5. The brush seal according to claim 1, wherein the integral projection is formed during non-cutting shaping of the supporting plate.

6. The brush seal according to claim 1, wherein the integral projection is one of lenticular and conical.

7. The brush seal according to claim 1, further including at least one pair of holes arranged in alignment in the second one of the stator and rotor, the axial section and the circumferential section, the at least one pair of holes being configured to receive a fastener.

8. The brush seal according to claim 7, wherein the fastener includes at least one of a rivet and a bolt.

9. The brush seal according to claim 1, wherein the bristles are arranged at an angle of 40° to 50° to a radial direction.

10. A brush seal for sealing a rotor with respect to a stator, comprising:
    bristles including free ends oriented toward a first one of the rotor and the stator; and
    a bristle housing, the bristles fastened in the bristle housing, the bristle housing press-fit in an axial space between a fastening element and a second one of the rotor and the stator, the bristle housing press-fit on the second one of the rotor and the stator against movement in a radial direction relative to the second one of the rotor and the stator, the bristle housing including
        a cover plate having an outer side surface arranged on a first axial side of the bristles and an axial section that extends axially from the outer side surface in an axial direction away from the bristles toward the first axial side to a free end disposed on the first axial side of the bristles,
        a supporting plate having an inner side surface arranged on a second axial side of the bristles opposite the first axial side, and a circumferential section that extends from the inner side surface in the axial direction from the second axial side of the bristles to the first axial side of the bristles and axially beyond the free end of the cover plate to a flanged section, the flanged section spaced apart from the free end of the cover plate and projecting radially inwardly beyond the free end of the cover plate so as to form an undercut between the flanged section, the free end of the cover plate, and the outer side surface, the flanged section having a free end that does not directly contact the cover plate, the bristles being fastened in the bristle housing between the inner side surface and the outer side surface;
    a weld spot projecting radially outwardly from the circumferential section; and
    a recess provided on the second one of the rotor and the stator;
    wherein the weld spot and the recess are configured to interact with each other in a positive-locking manner to provide definite positioning of the bristle housing so as to prevent relative rotation and reversed mounting of the entire bristle housing.

* * * * *